(12) United States Patent
Alonso

(10) Patent No.: US 6,557,295 B1
(45) Date of Patent: May 6, 2003

(54) RODENT TRAP DEVICE

(76) Inventor: Humberto Alonso, 6755 Indian Creek Dr. #7, Miami Beach, FL (US) 33141

( * ) Notice: Subject to any disclaimer, the term of this patent is extended or adjusted under 35 U.S.C. 154(b) by 0 days.

(21) Appl. No.: 09/844,363

(22) Filed: Apr. 27, 2001

(51) Int. Cl.[7] .................. A01M 23/04; A01M 23/10
(52) U.S. Cl. .................................. 43/69; 43/71
(58) Field of Search ........................... 43/61, 71, 64, 43/65, 68, 69

(56) References Cited

U.S. PATENT DOCUMENTS

| | | |
|---|---|---|
| 2,741,866 A | 4/1956 | Shirley |
| 2,775,844 A | 1/1957 | Barnes |
| 4,610,105 A | 9/1986 | Chandler |
| D360,251 S | 7/1995 | Russell |
| 5,517,784 A | 5/1996 | Sedore |
| 5,782,034 A | 7/1998 | Robin et al. |

*Primary Examiner*—Kurt Rowan
*Assistant Examiner*—Bethany L Griles

(57) ABSTRACT

A rodent trap device for catching and holding rodents. The rodent trap device includes a housing having a bottom wall and a peripheral wall extending upwardly from the bottom wall. A rotatable rod extends through the peripheral wall and bisects the housing. A lid having a top and bottom side covers an opening in a top side of the housing. The bottom side of the lid is attached to the rod and is pivotable in the housing. The lid has a first half and a second half with respect to the rod. The first half has a greater weight than the second half. A first stop is attached to the peripheral wall and is positioned over the second half of the lid. Bait is positioned on the top side of the second half such that a rodent pivots the lid and falls into the housing as it nears the bait.

6 Claims, 4 Drawing Sheets

RODENT TRAP DEVICE

BACKGROUND OF THE INVENTION

1. Field of the Invention

The present invention relates to rodent traps and more particularly pertains to a new rodent trap device for catching and holding rodents.

2. Description of the Prior Art

The use of rodent traps is known in the prior art. More specifically, rodent traps heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,782,034; U.S. Pat. No. 4,610,105; U.S. Pat. No. 5,517,784; U.S. Pat. No. 2,775,844; U.S. Pat. No. 2,741,866;. and U.S. Des. Pat. No. 360,251.

While these devices fulfill their respective, particular objectives and requirements, the aforementioned patents do not disclose a new rodent trap device. The inventive device includes a housing having a bottom wall and a peripheral wall extending upwardly from the bottom wall. A rod extends through the peripheral wall and generally bisects the housing. The rod is rotatably coupled to the peripheral wall. A lid for covering an opening in a top side of the housing comprises a plate having a top side and a bottom side. The lid is positioned in the housing and the bottom side is attached to the rod such that the lid is pivotable in the housing. The lid has a size adapted for generally covering an open top side of the housing. The lid has a first half and a second half with respect to the rod. The first half has a weight greater than a weight of the second half. A first stop is attached to the peripheral wall and is positioned over the second half of the lid when the lid is horizontally orientated. Bait is positioned on the top side of the second half of the lid such that a rodent pivots the lid and falls into the housing when the rodent nears the bait.

In these respects, the rodent trap device according to the present invention substantially departs from the conventional concepts and designs of the prior art, and in so doing provides an apparatus primarily developed for the purpose of catching and holding rodents.

SUMMARY OF THE INVENTION

In view of the foregoing disadvantages inherent in the known types of rodent traps now present in the prior art, the present invention provides a new rodent trap device construction wherein the same can be utilized for catching and holding rodents.

The general purpose of the present invention, which will be described subsequently in greater detail, is to provide a new rodent trap device apparatus and method which has many of the advantages of the rodent traps mentioned heretofore and many novel features that result in a new rodent trap device which is not anticipated, rendered obvious, suggested, or even implied by any of the prior art rodent traps, either alone or in any combination thereof.

To attain this, the present invention generally comprises a housing having a bottom wall and a peripheral wall extending upwardly from the bottom wall. A rod extends through the peripheral wall and generally bisects the housing. The rod is rotatably coupled to the peripheral wall. A lid for covering an opening in atop side of the housing comprises a plate having a top side and a bottom side. The lid is positioned in the housing and the bottom side is attached to the rod such that the lid is pivotable in the housing. The lid has a size adapted for generally covering an open top side of the housing. The lid has a first half and a second half with respect to the rod. The first half has a weight greater than a weight of the second half. A first stop is attached to the peripheral wall and is positioned over the second half of the lid when the lid is horizontally orientated. Bait is positioned on the top side of the second half of the lid such that a rodent pivots the lid and falls into the housing when the rodent nears the bait.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rodent trap device apparatus and method which has many of the advantages of the rodent traps mentioned heretofore and many novel features that result in a new rodent trap device which is not anticipated, rendered obvious, suggested, or even implied by any of the prior art rodent traps, either alone or in any combination thereof.

It is another object of the present invention to provide a new rodent trap device which may be easily and efficiently manufactured and marketed.

It is a further object of the present invention to provide a new rodent trap device which is of a durable and reliable construction.

An even further object of the present invention is to provide a new rodent trap device which is susceptible of a low cost of manufacture with regard to both materials and labor, and which accordingly is then susceptible of low prices of sale to the consuming public, thereby making such rodent trap device economically available to the buying public.

Still yet another object of the present invention is to provide a new rodent trap device which provides in the apparatuses and methods of the prior art some of the advantages thereof, while simultaneously overcoming some of the disadvantages normally associated therewith.

Still another object of the present invention is to provide a new rodent trap device for catching and holding rodents.

Yet another object of the present invention is to provide a new rodent trap device which includes a housing having a bottom wall and a peripheral wall extending upwardly from the bottom wall. A rod extends through the peripheral wall and generally bisects the housing. The rod is rotatably coupled to the peripheral wall. A lid for covering an opening in a top side of the housing comprises a plate having a top side and a bottom side. The lid is positioned in the housing and the bottom side is attached to the rod such that the lid is pivotable in the housing. The lid has a size adapted for generally covering an open top side of the housing. The lid has a first half and a second half with respect to the rod. The first half has a weight greater than a weight of the second half. A first stop is attached to the peripheral wall and is positioned over the second half of the lid when the lid is horizontally orientated. Bait is positioned on the top side of the second half of the lid such that a rodent pivots the lid and falls into the housing when the rodent nears the bait.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than hose set forth above will become apparent when consideration is given to the following detailed description thereof. Such description makes reference to the annexed drawings wherein.

DESCRIPTION OF THE PREFERRED EMBODIMENT

Figure 1:
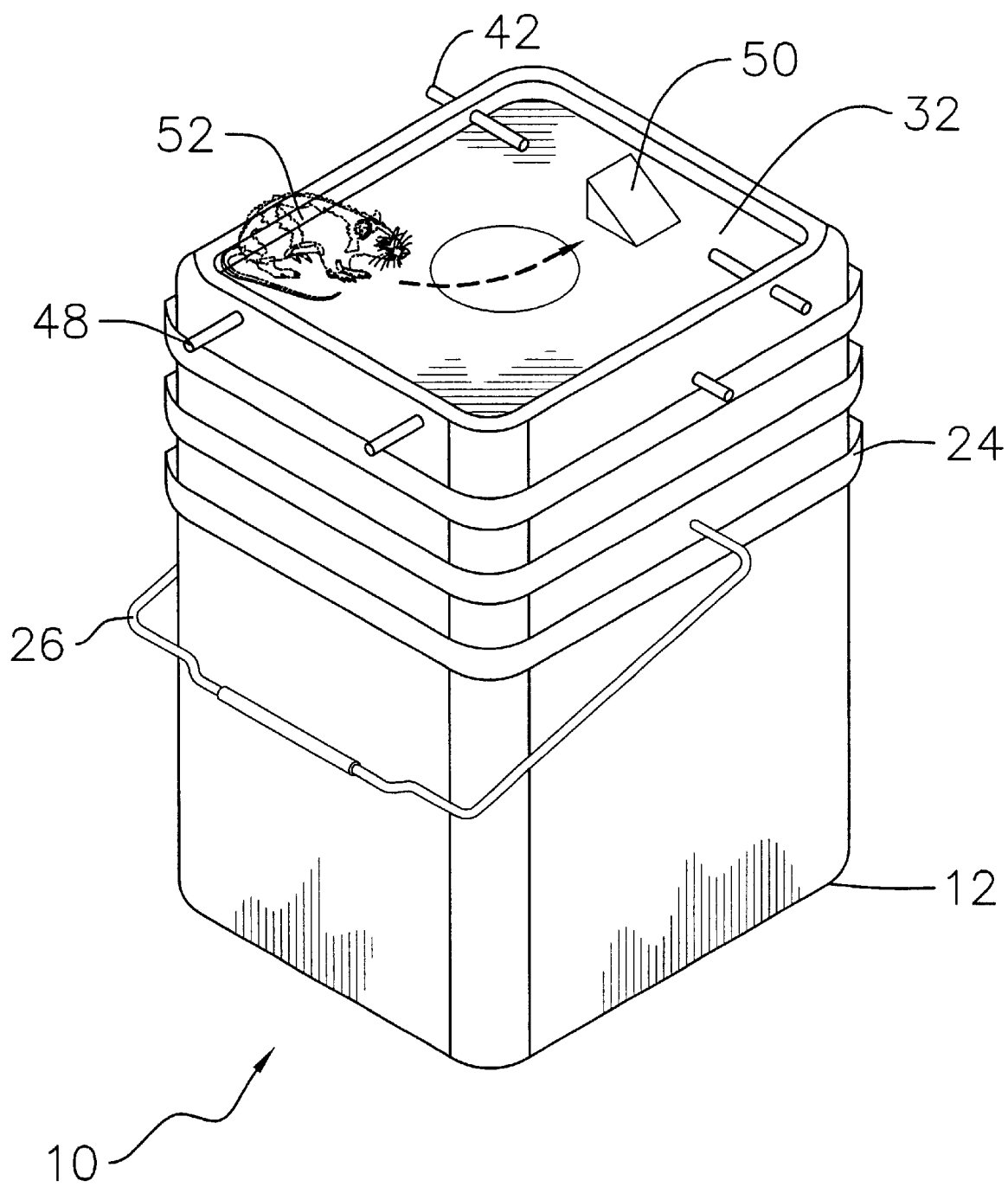
FIG. 1 is a schematic perspective view of a new rodent trap device according to the present invention.

With reference now to the drawings, and in particular to FIGS. 1 through 4 thereof, a new rodent trap device embodying the principles and concepts of the present invention and generally designated by the reference numeral 10 will be described.

As best illustrated in FIGS. 1 through 4, the rodent trap device 10 generally comprises a housing 10 having a bottom wall 13 and a peripheral wall 14 extending upwardly from the bottom wall 13. The peripheral wall 14 has a first wall 16, a second wall 18, a third wall 20 and a fourth wall 22. The first 16 and second 18 walls are opposite walls with respect to each other. An outer surface of the housing has a plurality of ridges 24 thereon. The housing 12 has a height greater than 18 inches. A handle 26 is preferably attached to the peripheral wall 14 of the housing 12.

A rod 28 extends through the peripheral wall 14 and generally bisects the housing 12. The rod 28 is rotatably coupled to the peripheral wall 14. The rod 28 is positioned generally adjacent to a top edge 15 of the peripheral wall 14. The rod 28 extends through the first 16 and second 18 walls.

A lid 30 for covering an opening in a top side of the housing 12 comprises a plate having a top side 32 and a bottom side 34. The lid 30 is positioned in the housing 12 and the bottom side 34 is attached to the rod 28 such that the lid 30 is pivotable in the housing 12. The lid 30 has a size adapted for generally covering an open top side of the housing 12. The lid 30 has a first half 36 and a second half 38 with respect to the rod 28. The first half 36 has a weight greater than a weight of the second half 38. The first half 36 of the lid 30 is weighted by a counter balance 40 attached to the bottom side 34 of the lid 30.

Figure 2:
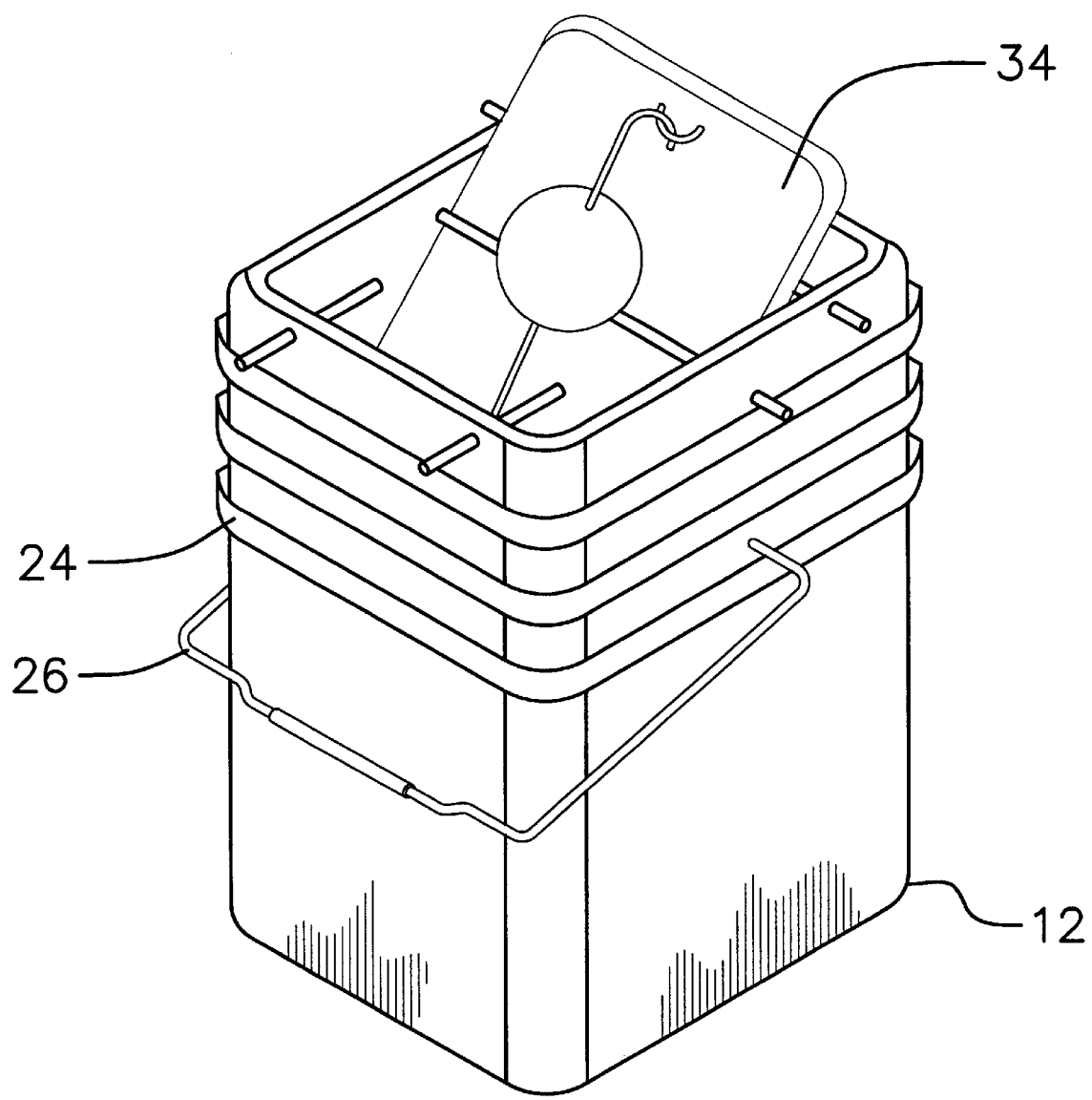
FIG. 2 is a schematic perspective view of the present invention.
Figure 3:
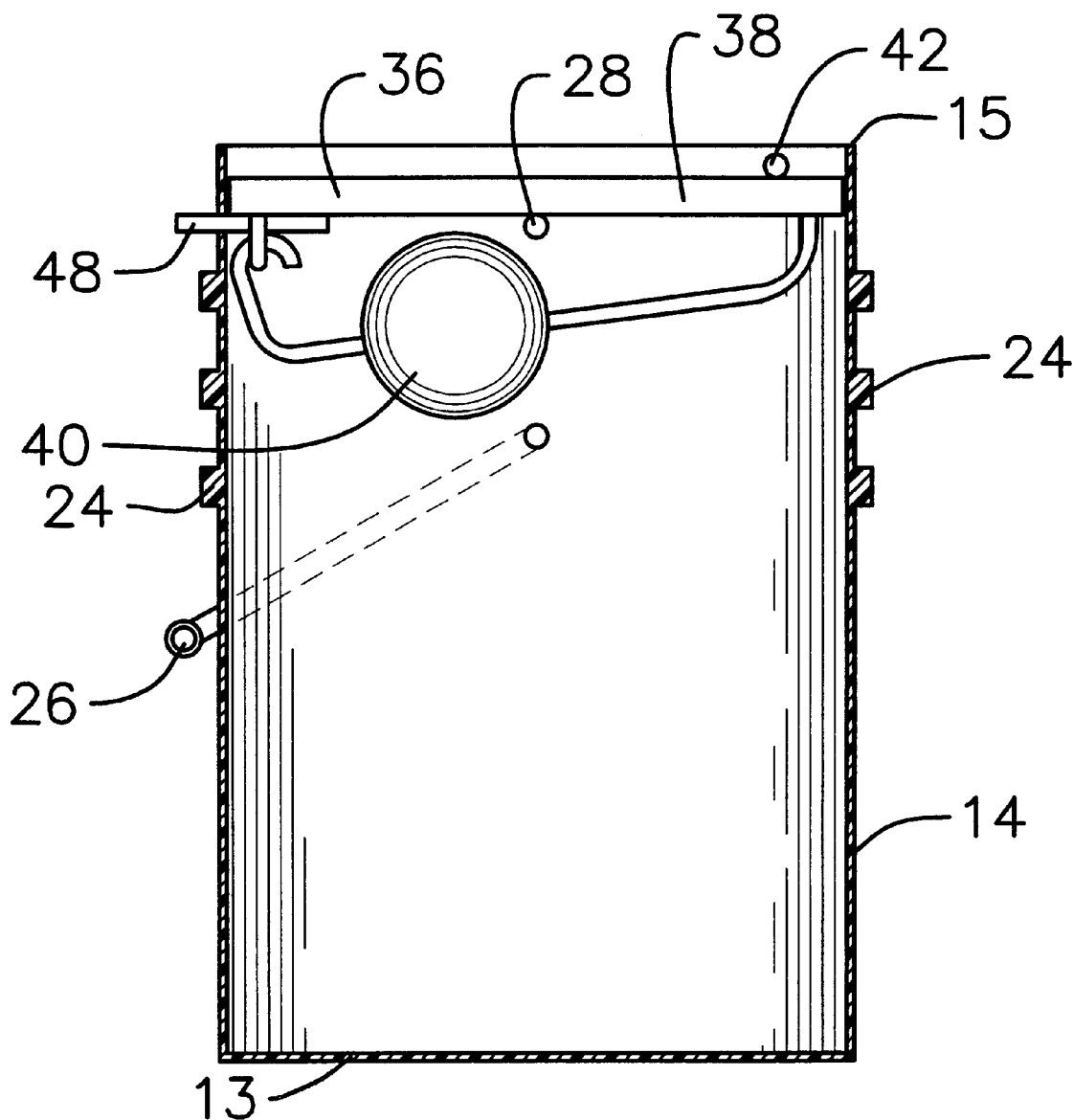
FIG. 3 is a schematic cross-sectional view of the present invention.
Figure 4:
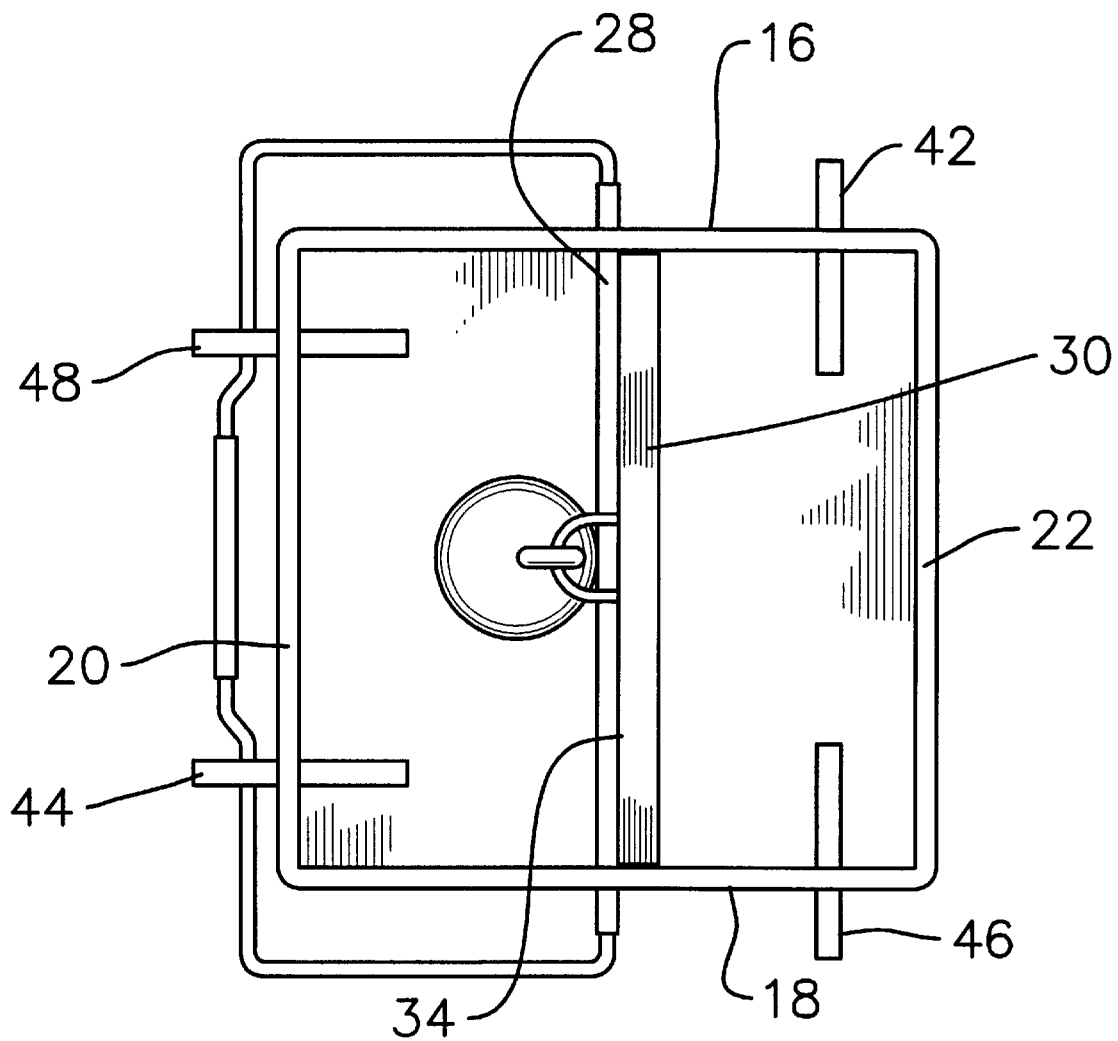
FIG. 4 is a schematic top view of the present invention.

A first stop 42 is attached to the peripheral wall 14 and is positioned over the second half 38 of the lid 30 when the lid 30 is horizontally orientated. A second stop 44 is attached to the peripheral wall 14 and is positioned below the first half 36 of the lid 30 when the lid 30 is horizontally orientated. A third stop 46 is attached to the peripheral wall 14 and is positioned over the second half 38 of the lid 30 when the lid 30 is horizontally orientated. The third stop 46 is positioned on the second wall 18 and is generally opposite of the first stop 42. A fourth stop 48 is attached to the peripheral wall 14 and is positioned below the first half 36 of the lid 30 when the lid 30 is horizontally orientated. The fourth stop 48 is positioned on the third wall 20 and spaced from the second stop 44. The stops allow the lid 30 to pivot in only one direction as shown in FIGS. 2 and 4.

In use, bait 50 is positioned on the top side 32 of the second half 38 of the lid 30 such that a rodent 52 pivots the lid 30 and falls into the housing 12 when the rodent 52 nears the bait 50. The housing 12 may be filled with water to drown the rodent, or the rodent may be released alive.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rodent trap comprising:

a housing having a bottom wall and a peripheral wall extending upwardly from said bottom wall;

a rod extending through said peripheral wall and generally bisecting said housing, said rod being rotatably coupled to said peripheral wall;

a lid for covering an opening in a top side of said housing, said lid comprising a plate having a top side and a bottom side, said lid being positioned in said housing and said bottom side being attached to said rod such that said lid is pivotable in said housing, said lid having a size adapted for generally covering an open top side of said housing, said lid having a first half and a second half with respect to said rod, said first half having a weight greater than a weight of said second half;

a first stop being attached to said peripheral wall and being positioned over said second half of said lid when said lid is horizontally orientated, said first stop being positioned on a first side of a pivot point for said lid;

a second stop being attached to said peripheral wall and being positioned below said first half of said lid when said lid is horizontally orientated, said second stop being positioned on a second side of said pivot point;

said first and second stops restricting pivoting of said lid such that said lid pivots only in one orientation; and wherein bait is positioned on said top side of said second half of said lid such that a rodent pivots said lid and falls into said housing when the rodent nears the bait.

2. The rodent trap as in claim 1, wherein said peripheral wall has a first wall, a second wall, a third wall and a fourth wall, said first and second walls being opposite walls with respect to each other, said rod extending through said first and second wall.

3. The rodent trap as in claim 2, wherein an outer surface of said housing has a plurality of ridges thereon.

4. The rodent trap as in claim 1, wherein said housing has a height greater than 18 inches.

5. The rodent trap as in claim 1, wherein said rod is positioned generally adjacent to a top edge of said peripheral wall.

6. A rodent trap comprising:

a housing having a bottom wall an d a peripheeral wall extending upwardly from said bottom wall, said peripheral wall having a first wall, a second wall, a third wall and a fourth wall, said first and second walls being opposite walls with respect to each other, an outer surface of said housing having a plurality of ridges thereon, said housing having a height greater than 18 inches;

a rod extending through said peripheral wall and generally bisecting said housing, said rod being rotatably coupled to said peripheral wall, said rod being positioned generally adjacent to a top edge of said peripheral wall, said rod extending through first and second walls;

a handle being attached to said peripheral wall of said housing;

a lid for covering an opening in a top side of said housing, said lid comprising a plate having a top side and a bottom side, said lid being positioned in said housing and said bottom side being attached to said rod such that said lid is pivotable in said housing, said lid having a size adapted for generally covering an open top side of said housing, said lid having a first half and a second half with respect to said rod, said first half having a weight greater than a weight of said second half, said first half of said lid being weighted by a counter balance;

a first stop being attached to said peripheral wall and being positioned over said second half of said lid when said lid is horizontally orientated;

a second stop being attached to said peripheral wall and being positioned below said first half of said lid when said lid is horizontally orientated;

a third stop being attached to said peripheral wall and being positioned over said second half of said lid when said lid is horizontally orientated, said third stop being positioned on said second wall and generally opposite of said first stop;

a fourth stop being attached to said peripheral wall and being positioned below said first half of said lid when said lid is horizontally orientated, said fourth stop being positioned on said third wall and spaced from said second stop; and wherein bait is positioned on said top side of said second half of said lid such that a rodent pivots said lid and falls into said housing when the rodent nears the bait.

* * * * *